July 10, 1934.  W. I. BETTIS  1,965,876
APPLICATOR FOR ELASTIC RINGS, ETC
Filed Oct. 31, 1928
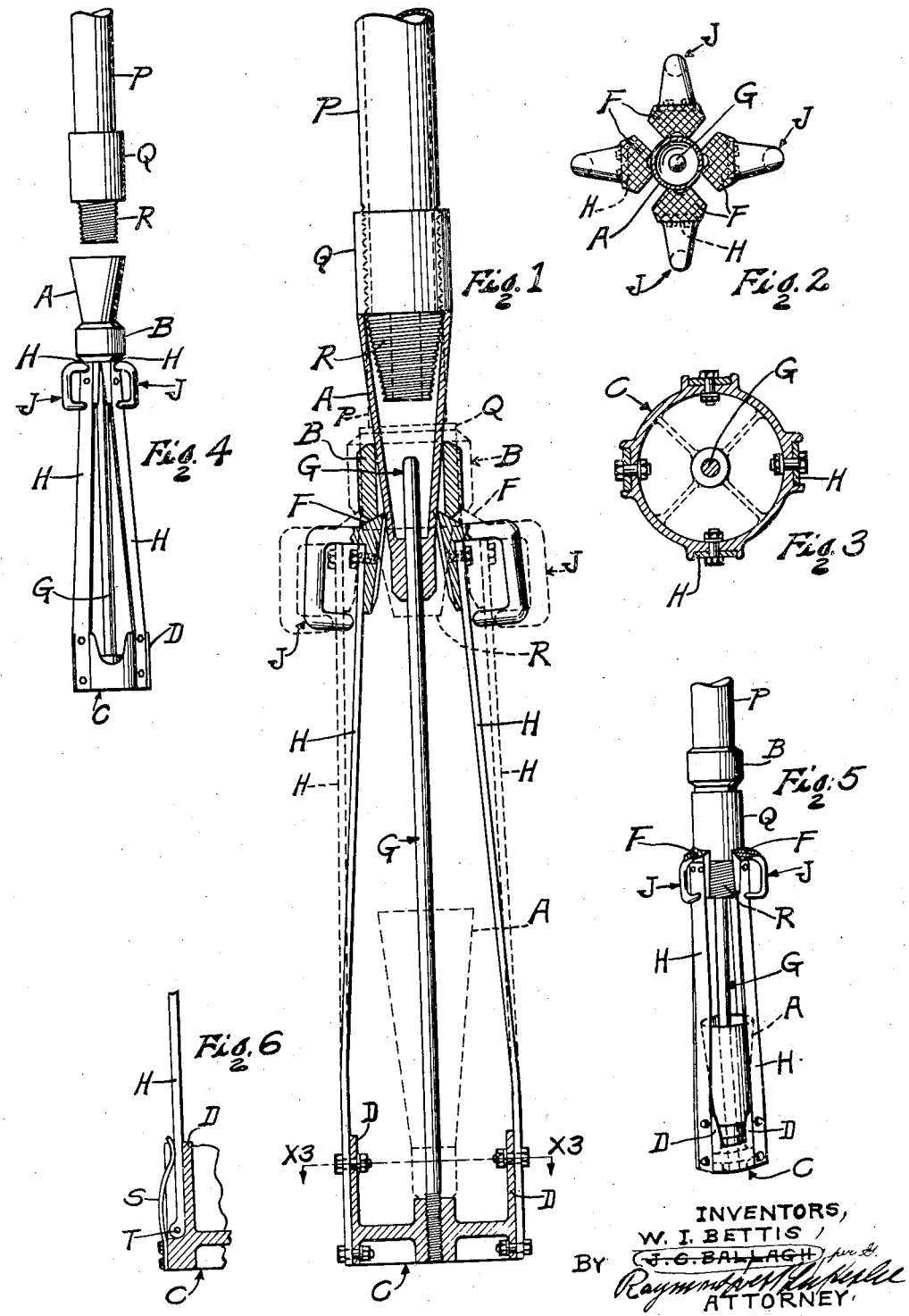
INVENTORS,
W. I. BETTIS
J. G. BALLAGH
BY
ATTORNEY Patented July 10, 1934

1,965,876

UNITED STATES PATENT OFFICE 1,965,876

APPLICATOR FOR ELASTIC RINGS, ETC.

William I. Bettis, Los Angeles, Calif., assignor to Patterson-Ballagh Corporation, Los Angeles, Calif., a corporation of California Application October 31, 1928, Serial No. 316,338

9 Claims. (Cl. 29—88.2)

This invention relates to means for and methods of applying elastic annular bands to pipes, tubes, rods, shafts and the like, particularly those subject to lateral movement or vibration, such as drill pipe used in well drilling. These bands encircle and grip the pipe and form buffers to protect it and the casing surrounding it from such damage as might come from violent impact or contact there-between.

The object, as stated, is to provide means and methods which will expand an annulus of elastic material to a greater diameter than it normally possesses, so that it will stretch over enlarged sections of a string of pipe, or similar cylindrical objects, which portions are passed through the distended ring, after which the ring contracts and grips the object which it surrounds, in a zone of a less diameter than that over which the ring was passed in expanded form.

The use of the rubber buffer, or protector, around pipes, particularly those used for drilling oil wells, and constituting the tool strings, is well-known and extensively employed. These rings are necessarily of considerable dimensions in order to provide a sufficient thickness of resilient material between the pipe, which it encircles, and the external wall or casing between which the ring intervenes to prevent impact. It is obvious that in order to uniformly stretch a rubber ring having a wall of considerable thickness and axial length some mechanical means must be provided, as it would be substantially impossible to stretch these rings and pull them over the tool joints, or increased external diameters of the drill string, manually, unless aided by some appropriate mechanism.

This invention provides such a tool or device for stretching the rubber ring uniformly and easily, and passing it over the larger diameter coupling or so-called, "tool joint", by manual operation. It includes an expanding or stretching member which is preferably a cone, whereof the small diameter is less than the inner diameter of the contracted annulus while the larger diameter is slightly greater than that of the tool joint. By inserting the small end of the expander into the ring, or annulus, and pushing it through the ring, the latter is gradually expanded. By following the expander, or cone, through the ring with a section of the drill string having a tool joint adjacent the cone base, the tool joint will follow through the ring directly behind the inverted cone. When the ring is pushed over the tool joint it then becomes only necessary to continue forcing the tool joint through the expanded ring until it passes the zone of the joint and slips onto the pipe itself when it there contracts and grips the pipe, as desired.

The invention consists in the novel and useful provision, form, construction, combination, interrelation and juxtaposition of the parts, members, features and arrangements all as hereinafter disclosed, shown in the drawing and, finally, pointed out in claims.

In the drawing:

Fig. 1 is an elevation of a device, for practicing the invention, being partly sectioned and showing a ring and a portion of a pipe, with a joint, ready for the operation of stretching the rubber buffer over it;

Fig. 2 is a plan of the device; and Fig. 3 is a section thereof on line X—X;

Figs. 4 and 5 show vertical elevations of the device but with the positions of its working parts differing from the position shown in Fig. 1, these views showing the sequence of steps attending the use of the device.

Fig. 6 is a detail, vertical section, showing a modification of construction of one of the parts.

Corresponding parts in the several figures are designated by the same reference letters.

In one preferred form of the invention and its mode of operation, shown in the drawing, a cone, "A" is used as the expanding element. This cone is shown in two positions in Fig. 1. The full lines show its initial position, just as the operation of forcing a ring over a tool joint is begun, the positions of the other parts of the device being likewise indicated in full lines for that particular stage of the operation. The dotted lines indicate the location of the cone "A" and the positions of the several parts of the device after the cone has passed through the ring and the latter has been expanded, and passed over the tool joint. "B" is the elastic ring to be distended and forced axially along the joint; "C" is the base portion of the device which rests on the floor, or ground, and is the member which supports and carries the other parts of the device. Projecting upwards from the basal portion "C", are flat portions or branches "D" preferably integral with the base "C", which form members for the reception and fixing of the vertical members which latter support the cone and the ring. The vertical members, "H", are shown as resilient or spring-like parts, which tend to converge, or spring together, towards the centre. These are fastened at their lower ends to the basal projections "D", in any preferred manner. The vertical members "H" extend from the point of fastening at the base, upwards to the top portion of the device. Obviously, the total clear height of the device must be somewhat in excess of the length of the cone, plus length of the tool joint. At the upper ends of members "H", inwardly-directed heads "F" are fastened which constitute enlargements of the upper ends of the vertical members. Said upper heads, "F", are intended each to form a component part of a separable ring-support, or a top member having a central opening, as shown in Fig. 2. The spring action of the supporting members "H" tends to draw the several parts of the support, together, towards the centre.

From the drawing it is seen that the supporting heads "F" are sloping in elevation, the slope running from the centre, where it is highest, to the outer edge of the heads. Also, the upper surface of these heads is roughened, preferably by crossing and intersecting grooves or ribs which form a checkered, toothed or knurled surface, as shown more particularly in Fig. 2. This construction provides a frictional surface on which the elastic ring rests when being expanded. Handles "J" are cast integral with the upper heads "F", but this is not an essential part of the invention. The central guide-bar "G", is fastened to the base portion and extends upwards a distance sufficient to project well into the cone "A" and the ring "B", when the parts are assembled for passing a ring over a tool joint. The internal chamber of the hollow expander, or cone, is of dimension to accommodate this guide-bar, as indicated.

The operation of this device is as follows: the ring to be put over the tool joint, and forced axially along this zone of largest diameter, is laid on the support heads "F" of the applicator, so that it holds its position on the checkered surfaces with its axis coincident with that of the guide-bar "G". The cone "A" is then placed over guide-bar "G", and lowered until it passes into the ring as far as the relative diameters of ring and cone apex permit. The apex of the cone is introduced between the four members "F" at the top, by springing them apart slightly. When this preparation is finished, the end of the pipe "P", carrying the tool joint, "Q" at its lower end, is let down to the cone. The tapered portion of the joint "Q", passes inside of the cone as indicated in the drawing, the shoulder of the tool joint resting on top of, and against, the base of the cone.

By lowering the pipe still further the cone is pressed into the ring which latter is unable to move downwards. Continuation of the progress of the pipe and tool joint will carry the parts downwards through the continually expanding ring, until the cone has passed completely through the ring and is released from contact with any of the parts, and so, falls to the bottom of the device, as indicated in the dotted lines in Figs. 1 and 5.

When this stage of the operation is reached, the expanded ring is over the tool joint as shown in the dotted lines in Fig. 1. The cone has passed from the conditions of operation and the ring expanded over the tool joint, but the placing of the ring, axially, is not completed. By continuing the movement of the pipe axially downwards, the ring still remaining in position on the upper surfaces of the divided upper heads "F", the joint is forced downwards through the ring, the guide-bar being accommodated by the pipe, and, finally, the smaller diameter of the pipe slides into the ring, whereupon the ring contracts, and, by its elasticity, grips and holds the pipe. In this position, indicated in the full lines at the top of Fig. 5, the pipe has been started in its elevation, in removal from the applicator, whereupon the cone may be removed from the guide-bar and a succeeding similar application commenced.

While the upwardly projecting members, "H", have been shown as made of spring metal, and, thereby, are pressed towards each other and the centre of the device, it is obvious that this construction may be modified in many ways and the same result achieved. For instance, Fig. 6 indicates one satisfactory construction which comprises a vertical member hinged at the lower end where it connects with the base portion "C". A leaf spring, "S", is fastened to the base with its upper end pressing against the member "H" in such a direction as to urge the latter inwards, thereby giving the uppermost parts and top heads the same tendency to spring towards the centre as do the springs shown in Figs. 1, 2, 3, 4 and 5.

The handles "J" are convenient for pulling outwardly the vertical members "H" to produce an opening large enough to introduce the small end of the cone "A" at the beginning of the operation of stretching a ring. But they represent mere conveniences and are in no wise essential for the satisfactory operation of the device. Preferably, they are cast integral with the top plates "F" though, as is obvious, they may be made separately and fastened to the members "H" in any convenient manner, or omitted entirely. While this applicator is operative without the central guide-bar, "G", this is needed for easy and convenient operation. Devices of this character have been made without this central guide and they have not been so easy to manipulate as the improved design having the guide-bar.

Having described my invention, I realize that many variants thereof are possible to those skilled in the art, that various changes may be made in the details both of construction and operation and that new arrangements, relationships and configurations of parts are easily possible, wherefore I do not limit myself to the form shown and herein described, but only to the general broad principles whereon this structure is designed and constructed.

I claim as my invention:

1. A method for positioning protecting rings upon drill pipe comprising mounting a protector upon a plurality of separable jaws, positioning a tapered mandrel between said jaws with its smaller end within said protector, lowering a drill pipe assembly into engagement with said mandrel, the diameter of the engaging portions of the mandrel and said assembly being equal, and further lowering said drill pipe assembly to force the mandrel through the protector and cause the protector to be moved onto the drill pipe.

2. A ring applicator comprising an expander and a plurality of relatively movable members forming a support for the ring to be expanded and adapted to permit the passage of the expander, there being a guide for the expander.

3. A device for expanding and mounting elastic protecting rings upon drill pipe, and the like, comprising a plurality of radially movable elastic ring-spreading jaws, a mandrel of tapering form movable axially between said jaws and through a protecting ring disposed upon said jaws to expand the same.

4. A device for expanding and mounting elastic protecting rings upon drill pipe and the like, comprising a base member, a plurality of movably supported jaws secured to said base member for supporting and spreading the lower end of an elastic protecting ring, a tapered mandrel adapted to enter the protecting ring to expand the upper end, and movable between said jaws.

5. A ring applicator comprising an expander having large and small ends and adapted to be passed through the ring, a support upon which the ring to be expanded may rest, said support comprising a plurality of segments whereof each is yieldably mounted, there being a central opening in said support adapted to receive the small end of the expander, and the segments being spread apart as the expander is passed therethrough.

6. A ring applicator comprising an apertured expansible structure against which a ring to be expanded is adapted to be supported at one end, and a tapered member adapted to be inserted through the ring into the aperture in the supporting structure and forced through the ring and the supporting structure to expand the ring for engagement over an article disposed in alignment with said member at the larger end thereof.

7. A device for expanding and mounting elastic protecting rings upon a drill pipe and the like, comprising a plurality of radially movable spreading jaws for supporting and spreading one end of an elastic protecting ring, a mandrel movable axially through a protecting ring and between the jaws and to expand the protecting ring supported upon said jaws.

8. An expanding device for placing elastic rings upon drill pipe, and the like, comprising a plurality of radially movable ring-spreading jaws, a mandrel movable axially between said jaws and adapted to receive and expand a protector held upon said jaws, a mandrel tapering in one direction for spreading one end of a protector ring, and said jaws tapering in another direction to assist spreading of the other end of the protecting ring.

9. A ring applicator comprising an apertured expansible structure against which a ring to be expanded is adapted to be supported at one end, a tapered member adapted to be inserted through the ring into the aperture in the supporting structure and forced through the ring and the supporting structure to expand the ring for engagement over an article disposed in alignment with said member at the larger end thereof, and a guide rod for the tapered member disposed centrally of the aperture in said supporting structure, the tapered member having an axial bore to receive said guide rod.

WILLIAM I. BETTIS.